(12) United States Patent
Seo et al.

(10) Patent No.: US 11,747,918 B2
(45) Date of Patent: Sep. 5, 2023

(54) TOUCH PEN FOR AN ELECTRONIC DEVICE

(71) Applicant: SAMSUNG ELECTRONICS CO., LTD., Suwon-si (KR)

(72) Inventors: Jong Pil Seo, Suwon-si (KR); Dong Keun Kang, Suwon-si (KR); Dong Oh Kim, Suwon-si (KR); Sung Jun Kim, Suwon-si (KR); You Sub Lee, Suwon-si (KR); Yoong-Kwan Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/678,465

(22) Filed: Feb. 23, 2022

(65) Prior Publication Data

US 2022/0179505 A1 Jun. 9, 2022

Related U.S. Application Data

(63) Continuation of application No. PCT/KR2019/015392, filed on Nov. 13, 2019.

(30) Foreign Application Priority Data

Sep. 5, 2019 (KR) ........................ 10-2019-0110241

(51) Int. Cl.
*G06F 3/0354* (2013.01)
(52) U.S. Cl.
CPC ................................ *G06F 3/03545* (2013.01)

(58) Field of Classification Search
CPC .................................................. G06F 3/03545
See application file for complete search history.

(56) References Cited

U.S. PATENT DOCUMENTS

| | | | |
|---|---|---|---|
| 10,437,359 B1* | 10/2019 | Wang | G06F 3/016 |
| 2009/0251442 A1* | 10/2009 | Nakata | G06F 3/046 345/179 |
| 2013/0234999 A1* | 9/2013 | Kuno | G06F 3/03545 345/179 |
| 2014/0125606 A1* | 5/2014 | Namkung | G06F 1/169 345/173 |

(Continued)

FOREIGN PATENT DOCUMENTS

| CN | 109542254 A | * 3/2019 | ......... G06F 3/03545 |
|---|---|---|---|
| JP | 2000-227321 A | 8/2000 | |

(Continued)

OTHER PUBLICATIONS

International Search Report dated Jun. 4, 2020, for Application No. PCT/KR2019/015392.

*Primary Examiner* — David D Davis
(74) *Attorney, Agent, or Firm* — STAAS & HALSEY LLP

(57) ABSTRACT

The disclosure relates to a touch pen capable of being used in electronic devices. The touch pen includes a pen body having an accommodation space extending in a longitudinal direction, a pen tip coupled to one end of the pen body, a plurality of weight members disposed inside the accommodation space of the pen body, and a buffer material disposed between adjacent weight members among the plurality of weight members to prevent movement of the plurality of weight members in the longitudinal direction.

10 Claims, 12 Drawing Sheets

(56) References Cited

U.S. PATENT DOCUMENTS

| | | | |
|---|---|---|---|
| 2015/0153848 A1* | 6/2015 | Lien | G06F 3/03545 |
| | | | 345/173 |
| 2016/0282970 A1* | 9/2016 | Evreinov | G06F 3/0383 |
| 2017/0068342 A1* | 3/2017 | Zimmerman | G06F 3/04162 |
| 2017/0269719 A1 | 9/2017 | Tsai et al. | |
| 2017/0302021 A9* | 10/2017 | Amini | H01R 13/56 |
| 2019/0179432 A1* | 6/2019 | Hsu | G06F 3/03545 |

FOREIGN PATENT DOCUMENTS

| | | |
|---|---|---|
| JP | 2009-251678 | 10/2009 |
| JP | 2010-191726 A | 9/2010 |
| JP | 2016-186696 A | 10/2016 |
| KR | 10-2014-0051666 A | 5/2014 |
| KR | 10-2014-0056959 A | 5/2014 |
| KR | 10-2018-0033278 | 4/2018 |

* cited by examiner

TOUCH PEN FOR AN ELECTRONIC DEVICE

CROSS REFERENCE TO RELATED APPLICATIONS

This application is a continuation application under 35 U.S.C. § 111(a) of International Application No. PCT/KR2019/015392, filed on Nov. 13, 2019, which claims priority to Korean Patent Application No. 10-2019-0110241 filed on Sep. 5, 2019. The disclosures of International Application No. PCT/KR2019/015392 and Korean Patent Application No. 10-2019-0110241 are incorporated by reference herein in their entirety.

BACKGROUND

1. Field

The disclosure relates to a touch pen, and for example, to a touch pen capable of being used in electronic devices.

2. Description of the Related Art

In general, a touch pen includes a pen tip and a pen body, the pen tip, which is a part that directly touches a display to perform a touch operation, is mainly made of acetyl yarn, and the pen body includes a weight member for weight compensation therein.

Because a known pen tip uses an acetyl yarn material so that a diameter of a portion where the pen tip touches a display needs to be large, an exterior design of the pen is deteriorated.

Because the weight member is made of a metal material, noise is generated when the weight member is directly inserted or the touch pen shaken during use, and in order to prevent this, an adhesive or auxiliary material needs to be separately used. In addition, some noise is generated even when an auxiliary material is added depending on machining tolerances in a longitudinal direction.

SUMMARY

Aspects of the disclosure will be set forth in part in the description which follows and, in part, will be apparent from the description, or may be learned by practice of the disclosure.

The disclosure is directed to providing a touch pen capable of preventing noise.

The disclosure is directed to providing a touch pen capable of being assembled without the need for a separate adhesive.

The disclosure is directed to providing a touch pen with a reduced diameter and luxurious appearance.

An aspect of the disclosure provides a touch pen for an electronic device, which includes a pen body having an accommodation space extending in a longitudinal direction, a pen tip coupled to one end of the pen body, a plurality of weight members disposed inside the accommodation space, and a buffer material disposed between adjacent weight members among the plurality of weight members to prevent movement of the plurality of weight members in the longitudinal direction.

The plurality of weight members may include a first weight member, a second weight member, and a third weight member disposed in the longitudinal direction, and the buffer material may include a first buffer material disposed between the first weight member and the second weight member, and a second buffer material disposed between the second weight member and the third weight member.

The pen tip may include a first contact part disposed inside the accommodation space, and the first weight member may be in contact with the first contact part.

The pen tip may be a first pen tip, the touch pen may further include a second pen tip disposed at another end of the pen body which includes a second contact part disposed inside the accommodation space, and the third weight member may be in contact with the second contact part.

The pen tip may be a first pen tip, the touch pen may further include a second pen tip disposed at another end of the pen body which includes a second contact part disposed inside the accommodation space, the plurality of weight members may include a first weight member disposed in contact with the first pen tip and a second weight member disposed in contact with the second pen tip, and the buffer material may be disposed between the first weight member and the second weight member.

A cross-section of the pen body may have a serration shape such that a separate adhesive is not required to prevent noise from being generated by one or more of the plurality of weight members when the touch pen is shaken.

One or more of the plurality of weight members may include a magnet.

The buffer material may include a rubber material.

The pen tip may include a wood material.

The pen tip may be a first pen tip, and the touch pen may further include a second pen tip coupled to another end of the pen body. The plurality of weight members may include a first weight member and a second weight member, the buffer material may be disposed inside the accommodation space and disposed in the longitudinal direction with respect to the first weight member to fix the first weight member.

The first pen tip may include a first contact part disposed inside the accommodation space, the second pen tip may include a second contact part disposed inside the accommodation space, the first weight member may be in contact with the first contact part, and the touch pen may further include another buffer material disposed inside the accommodation space and in contact with the second contact part.

The first weight member and the second weight member may be disposed in the longitudinal direction, the buffer material may be disposed between the first weight member and the second weight member, and the second buffer material may be disposed in contact with the second weight member and the second contact part.

The buffer material may be disposed between the first weight member and the second pen tip, and the another buffer material may be disposed between the second weight member and the second pen tip.

The plurality of weight members may further include a third weight member disposed in the longitudinal direction, the buffer material may be disposed between the first weight member and the second weight member, and the touch pen may further include another buffer material disposed between the second weight member and the third weight member.

The first weight member may be disposed in contact with the first pen tip, the second weight member may be disposed in contact with the second pen tip, and the buffer material may be disposed between the first weight member and the second weight member.

Another aspect of the disclosure provides a touch pen for an electronic device, which includes a pen body having an accommodation space extending in a longitudinal direction, a first pen tip coupled to one end of the pen body, a second pen tip coupled to another end of the pen body, a first weight member disposed inside the accommodation space, and a buffer material disposed inside the accommodation space and disposed in the longitudinal direction with respect to the first weight member to fix the first weight member.

The first pen tip may include a first contact part disposed inside the accommodation space, the second pen tip may include a second contact part disposed inside the accommodation space, the first weight member may be in contact with the first contact part, and the buffer material may be in contact with the second contact part.

The touch pen may further include a second weight member disposed in the longitudinal direction, and the buffer material may include a first buffer material disposed between the first weight member and the second weight member, and a second buffer material disposed in contact with the second weight member and the second pen tip.

The buffer material may be disposed between and in contact with the first weight member and the second pen tip.

The touch pen may further include a second weight member and a third weight member disposed in the longitudinal direction, and the buffer material may include a first buffer material disposed between the first weight member and the second weight member, and a second buffer material disposed between the second weight member and the third weight member.

The first weight member may be disposed in contact with the first pen tip and the touch pen may further include a second weight member disposed in contact with the second pen tip, and the buffer material may be disposed between the first weight member and the second weight member.

One or more of the first weight member, the second weight member, and the third weight member may include a magnet.

The buffer material may include a rubber material.

A cross-section of the pen body may have a serration shape such that a separate adhesive is not required when the pen tip is installed.

The first pen tip and the second pen tip may include a wood material.

BRIEF DESCRIPTION OF THE DRAWINGS

These and/or other aspects of the disclosure will become apparent and more readily appreciated from the following description of the example embodiments, taken in conjunction with the accompanying drawings of which.

DETAILED DESCRIPTION

Figure 1:
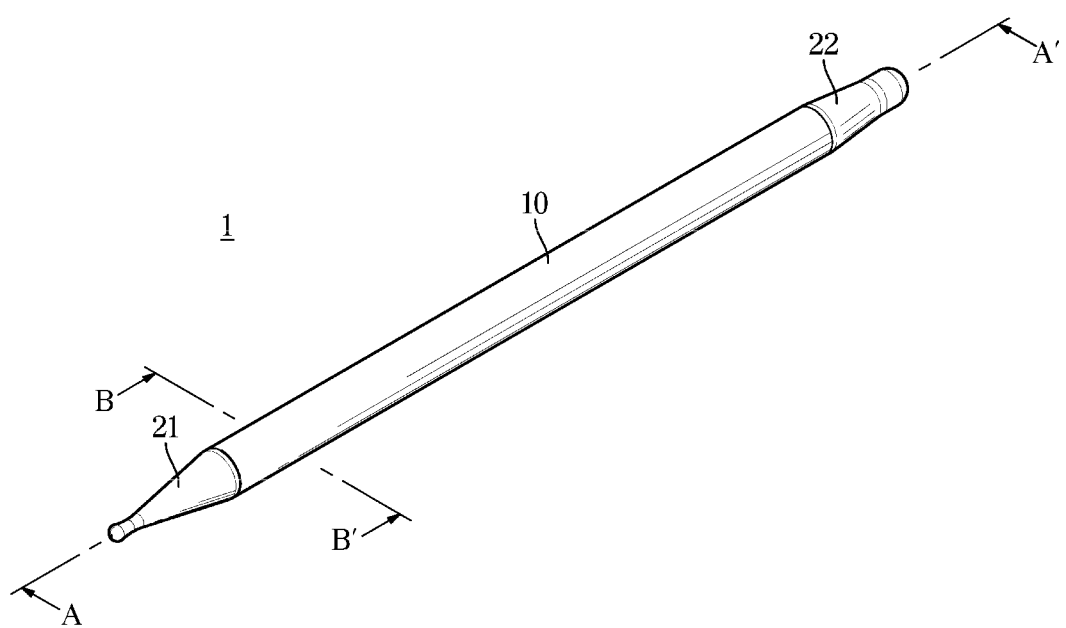
FIG. 1 is a perspective view of a touch pen according to an embodiment of the disclosure.

The embodiments described in the specification and the configurations shown in the drawings are examples embodiments of the disclosure, and various modifications may be made to replace the embodiments and drawings of the specification.

Like reference numbers or signs in the various drawings of the application represent parts or components that perform substantially the same functions.

The terms used herein are for the purpose of describing the embodiments and are not intended to restrict and/or to limit the disclosure. For example, the singular expressions herein may include plural expressions, unless the context clearly dictates otherwise. Also, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that, although the terms first, second, etc. may be used herein to describe various components, these components should not be limited by these terms. These terms are only used to distinguish one component from another. For example, without departing from the scope of the disclosure, the first component may be referred to as a second component, and similarly, the second component may also be referred to as a first component.

The term "and/or" includes any combination of a plurality of related items or any one of a plurality of related items. For example, the scope of the expression or phrase "A and/or B" includes the item "A", the item "B", and the combination of items "A and B".

In addition, the scope of the expression or phrase "at least one of A and B" is intended to include all of the following: (1) at least one of A, (2) at least one of B, and (3) at least one A and at least one of B. Likewise, the scope of the expression or phrase "at least one of A, B, and C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

It will be understood that when an element is referred to as being "connected" to another element, the expression encompasses an example of a direct connection or direct coupling, as well as a connection or coupling with another element interposed therebetween.

The term "longitudinal direction" used in the following description is defined based on the drawings, and a shape and position of each component are not limited by this term.

According to the disclosure, because a buffer material is inserted into a touch pen, noise caused by a weight member can be prevented.

According to the disclosure, because the touch pen can be mounted on an electronic device by using a magnetic material for the weight member, user convenience can be improved.

According to the disclosure, a weight of the touch pen can be adjusted and thus the cost of the touch pen can be reduced.

Touch pens according to embodiments of the disclosure may be devices capable of performing various inputs to an electronic device on behalf of a hand of a user.

An electronic device according to embodiments of the disclosure may include at least one of electronic devices using an infrared touch sensor, such as, for example, a smart phone (smartphone), a tablet PC (tablet personal computer), a mobile phone (mobile phone), a videophone, an e-book reader, a desktop PC (desktop personal computer), a laptop PC (laptop personal computer), a netbook computer, a workstation, a server, a personal digital assistant (PDA), a portable multimedia player (PMP), a MP3 player, a mobile medical device, a camera, a wearable device (e.g., smart glasses, head-mounted-device (HMD)), an electronic garment, an electronic bracelet, an electronic necklace, an electronic appcessory, an electronic tattoo, a smart mirror, a smartwatch, and a kiosk.

According to some embodiments, an electronic device may include at least one of electronic devices using an infrared touch sensor, such as a piece of furniture or a building/structure, an electronic board, an electronic signature receiving device, a projector, and various measuring instruments (e.g., water, electricity, gas, or radio wave measuring instruments, etc.). In various embodiments, an electronic device may be a combination of one or more of the various devices described above. An electronic device according to any embodiment may be a flexible electronic device. In addition, an electronic device according to an embodiment of the disclosure is not limited to the above-described devices, and may include a new electronic device according to technological development.

Hereinafter, embodiments of the disclosure will be described in detail with reference to the accompanying drawings.

Figure 2:
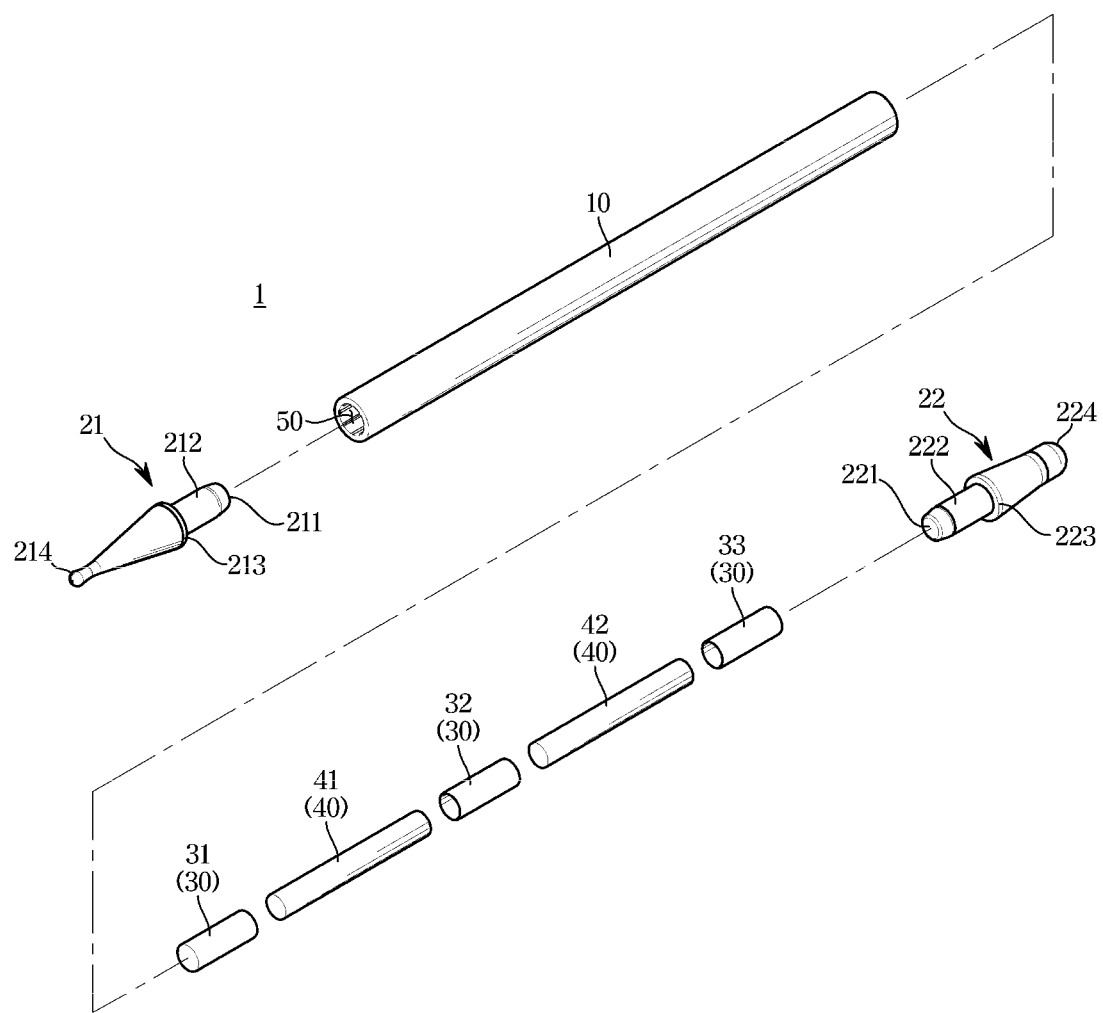
FIG. 2 is an exploded perspective view of the touch pen illustrated in FIG. 1.
Figure 3:
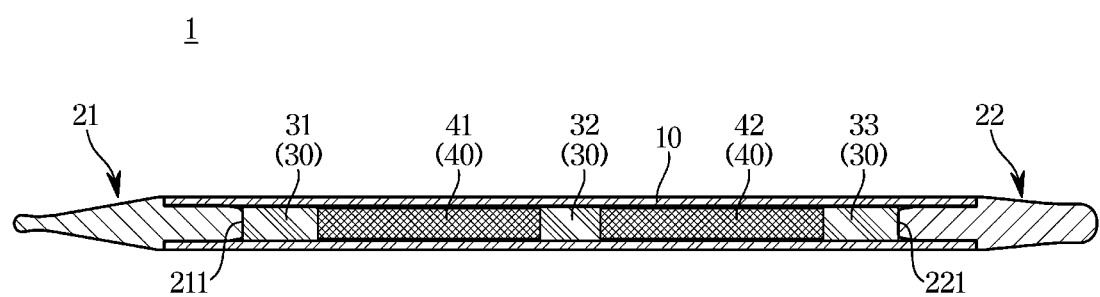
FIG. 3 is a cross-sectional view taken along line A-A' in FIG. 1.
Figure 4:
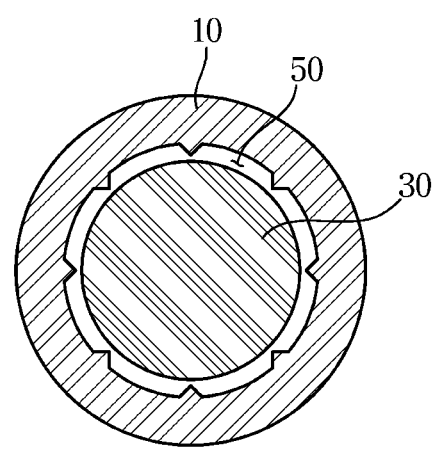
FIG. 4 is a cross-sectional view taken along line B-B' in FIG. 1.

FIG. 1 is a perspective view of a touch pen according to an embodiment of the disclosure. FIG. 2 is an exploded perspective view of the touch pen illustrated in FIG. 1. FIG. 3 is a cross-sectional view taken along line A-A' in FIG. 1. FIG. 4 is a cross-sectional view taken along line B-B' in FIG. 1.

Referring FIGS. 1 to 4, a touch pen 1 may include a pen body 10 and pen tips 21 and 22.

The pen body 10 has an accommodation space 50 extending in a longitudinal direction. The pen body 10 may also include a plurality of weight members 30 and at least one buffer material 40 in the accommodation space to prevent movement in the longitudinal direction. The pen body 10 may be manufactured by extrusion, injection, drawing, or the like.

The accommodation space 50 may be formed in the shape of a rod extending in the longitudinal direction. In the drawings, the accommodation space 50 is shown to have a cylindrical shape, but the disclosure is not limited thereto. The rod shape of the accommodation space 50 is not limited to a cylindrical shape, a rectangular parallelepiped shape, and the like, and may have various shapes.

The plurality of weight members 30 may include a first weight member 31, a second weight member 32, and a third weight member 33, which are arranged in the longitudinal direction. The at least one buffer material 40 may include a first buffer material 41 and a second buffer material 42. The first buffer material 41 may be disposed between the first weight member 31 and the second weight member 32. The second buffer material 42 may be disposed between the second weight member 32 and the third weight member 33.

The plurality of weight members 30 may include a magnetic material such as a magnet to be mounted on a bezel of an electronic device such as the aforementioned E-board (electronic board).

The at least one buffer material 40 may include a rubber material. The rubber material of the at least one buffer material 40 according to the embodiments of the disclosure may include at least one of EPDM rubber (Ethylene Propylene Diene Monomer Rubber), silicone, CR (Chloroprene Rubber), and NBR (Nitrile-Butadiene Rubber). In addition, a material may be used as the buffer material as long as it has elasticity and may be processed into a cylinder shape with a diameter of about 5 mm, and is not limited to the above materials.

The pen tips 21 and 22 may include the first pen tip 21 coupled to one end of the pen body 10, and the second pen tip 22 coupled to the other end of the pen body 10. The first pen tip 21 may include a first contact part 211 inserted into the accommodation space 50, and the first weight member 31 may be in contact with the first contact part 211. The second pen tip 22 may include a second contact part 221 inserted into the accommodation space 50, and the third weight member 33 may be in contact with the second contact part 221.

The first pen tip 21 may include a first distal end 214 having a small radius to enable a touch of a fine portion. The first pen tip 21 may include a first press-fitted part 212 for coupling with the pen body 10. The first press-fitted part 212 may be inserted into the accommodation space 50 when combined with the pen body 10. A first middle part 213 of the first pen tip 21 may have the largest diameter.

The second pen tip 22 may include a second distal end 224 having a blunt shape to draw a thick line. The second pen tip 22 may include a second press-fitted part 222 for coupling with the pen body 10. The second press-fitted part 222 may be inserted into the accommodation space 50 when combined with the pen body 10. A second middle part 223 of the second pen tip 22 may have the largest diameter.

In order to prevent noise, the sum of lengths of the plurality of weight members 30 and the at least one buffer material 40 may be longer than a length obtained by subtracting lengths of the first press-fitted part 212 and the second press-fitted part 222 from a length of the pen body 10.

The pen tips 21 and 22 may include a wood material to improve luxury of an appearance thereof and a touch quality of a display. By using the wood material, the wear of the pen tip may be minimized compared to a conventional pen tip, and a touch feeling in contact with an electronic device may be improved. The wood material is not limited to pine wood, cypress wood, and cypress wood, and may include various wood materials.

A cross-section of the pen body 10 may have a serration shape such that a separate adhesive is not required when the pen tips 21 and 22 are installed. When the pen body 10 and the pen tips 21 and 22 are combined, they may be assembled into a finished product through a press-fitting process according to the serration shape. The serration shape may have a cross-section of a shaft manufactured as a trapezoidal or triangular sawteeth cross-section.

Figure 5:
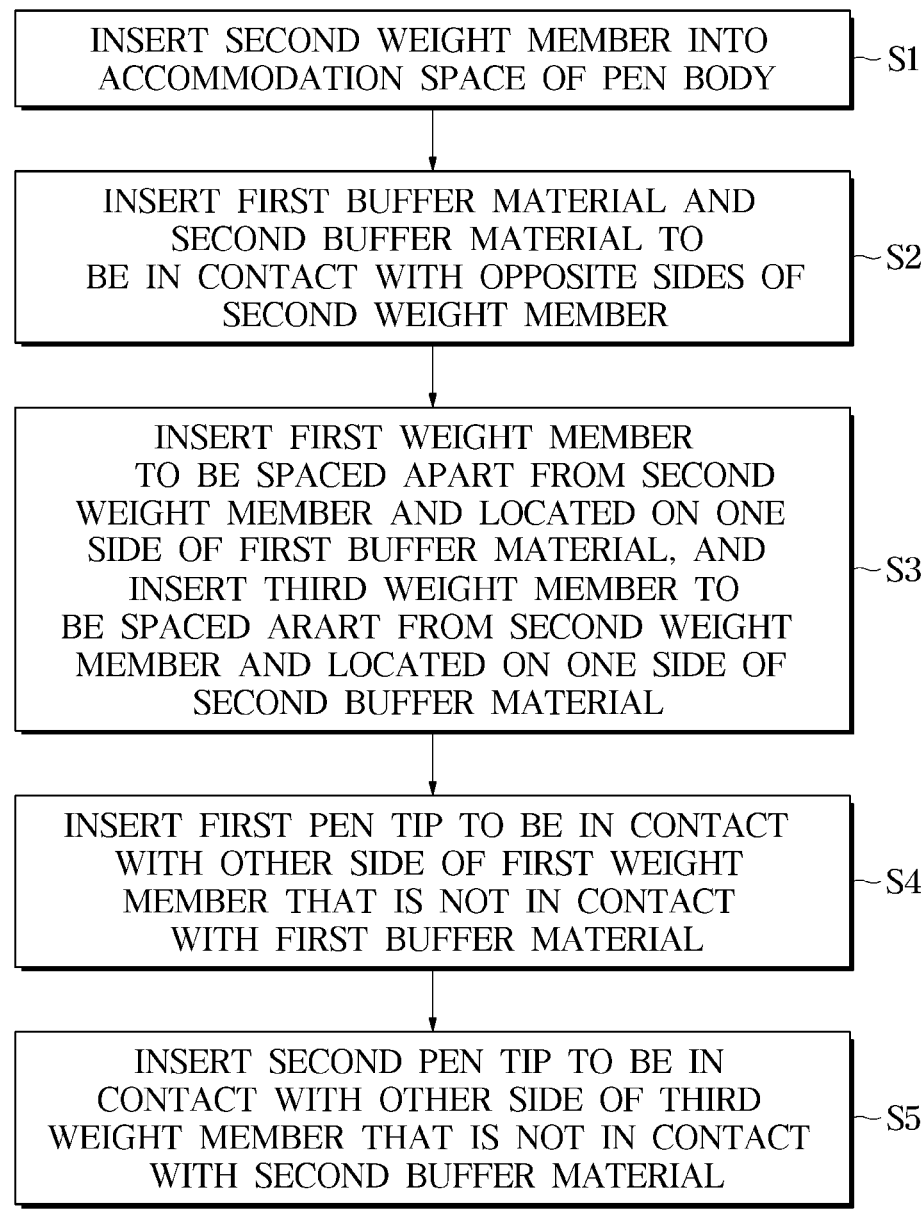
FIG. 5 is a block diagram illustrating a method of manufacturing the touch pen according to an embodiment of the disclosure.

FIG. 5 is a block diagram illustrating a method of manufacturing the touch pen according to an embodiment of the disclosure.

Referring to FIG. 5, the second weight member 32 is inserted into the accommodation space 50 of the pen body 10 (S1). The first buffer material 41 and the second buffer material 42 are inserted to be in contact with opposite sides of the second weight member 32 (S2). The first weight member 31 is spaced apart from the second weight member 32 and inserted into one side of the first buffer material 41, and the third weight member 33 is spaced apart from the second weight member 32 and inserted into one side of the second buffer material 42 (S3). The first pen tip 21 is inserted to be in contact with the other side of the first weight member 31 that is not in contact with the first buffer material 41 (S4). The second pen tip 22 is inserted to be in contact with the other side of the third weight member 33 that is not in contact with the second buffer material 42 (S5).

Figure 6:
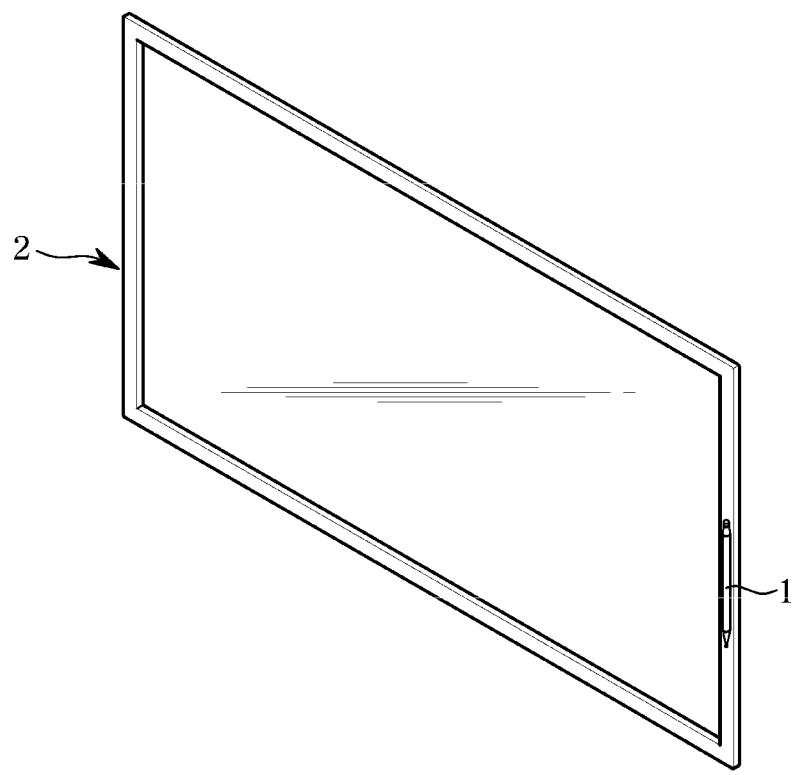
FIG. 6 is a perspective view illustrating a state in which the touch pen is mounted on an electronic device according to an embodiment of the disclosure.

FIG. 6 is a perspective view illustrating a state in which the touch pen is mounted on an electronic device according to an embodiment of the disclosure.

Referring to FIG. 6, because the plurality of weight members 30 of the touch pen 1 may include a magnetic material, the plurality of weight members 30 may be disposed on an electronic device 2 such as the E-board. Accordingly, a user interface (UI) and a user eXperience (UX) of the embodiment may be improved.

Figure 7:
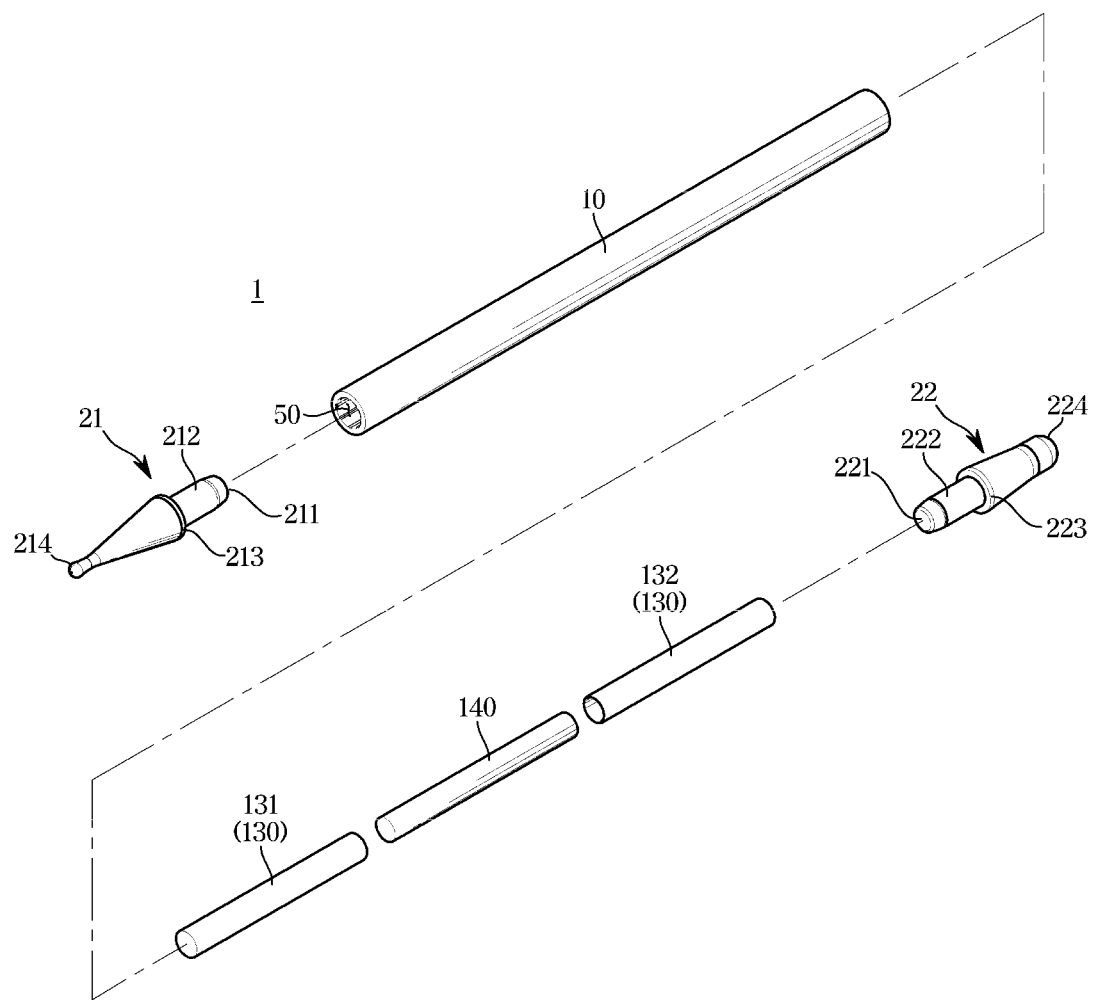
FIG. 7 is an exploded perspective view of a touch pen according to another embodiment of the disclosure.
Figure 8:
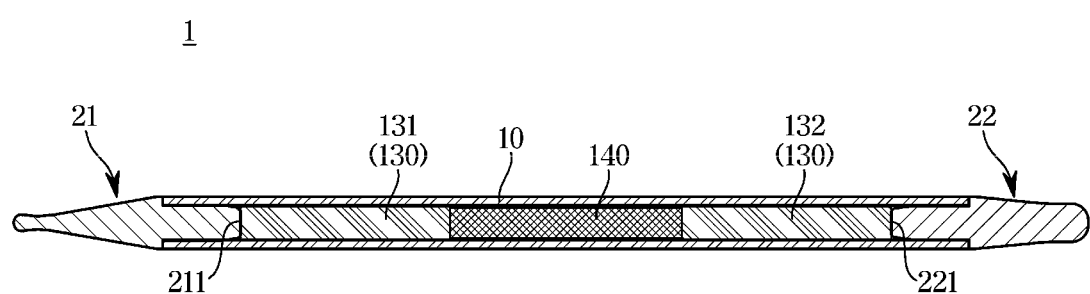
FIG. 8 is a cross-sectional view of the touch pen illustrated in FIG. 7.

FIG. 7 is an exploded perspective view of a touch pen according to another embodiment of the disclosure. FIG. 8 is a cross-sectional view of the touch pen illustrated in FIG. 7.

Because a basic configuration of the touch pen has been described above with reference to FIGS. 1 to 4, the same description will be omitted and only differences will be described.

Referring to FIGS. 7 and 8, a plurality of weight members 130 may include a first weight member 131 disposed in contact with the first pen tip 21, and a second weight member 132 disposed in contact with the second pen tip 22. At least one buffer material 140 may be disposed between the first weight member 131 and the second weight member 132.

Figure 9:
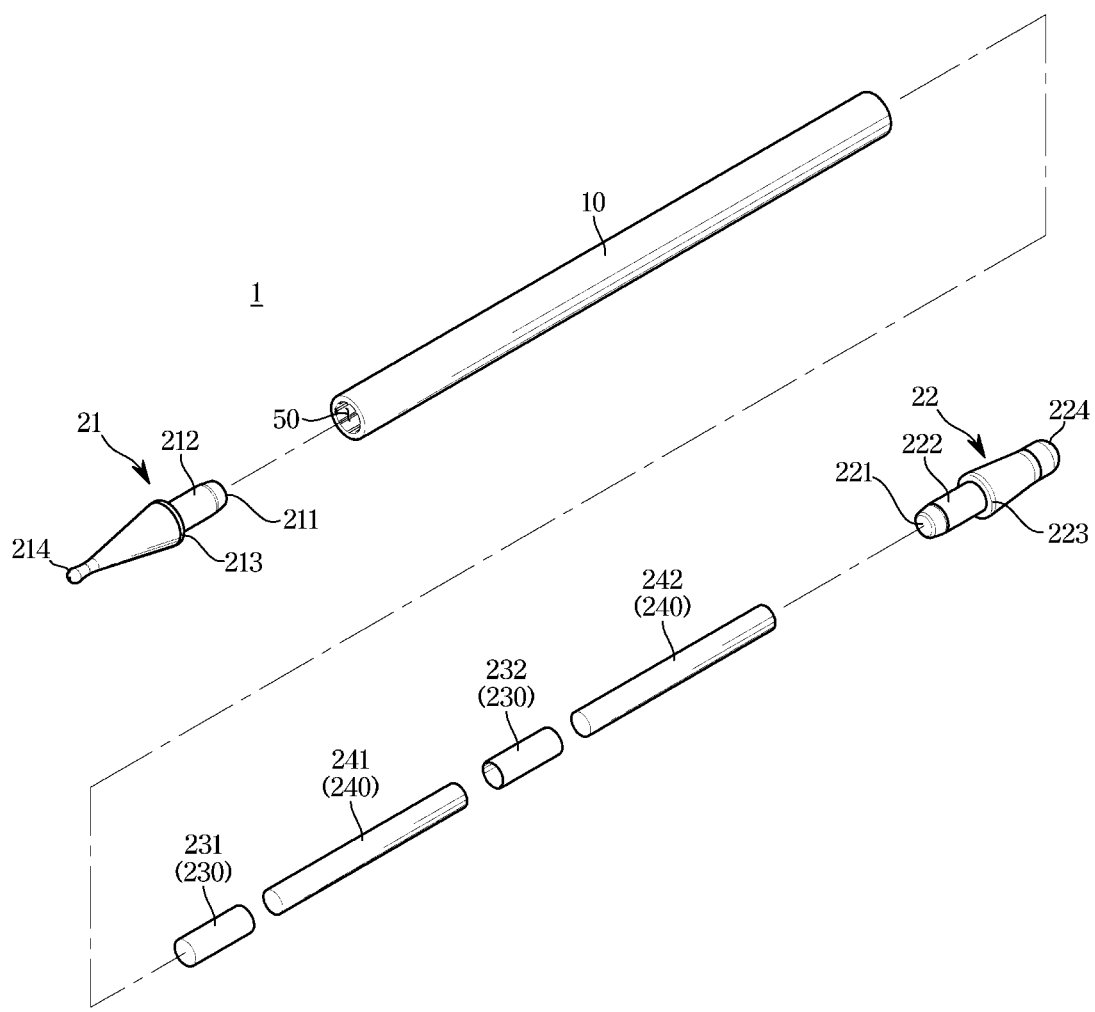
FIG. 9 is an exploded perspective view of a touch pen according to another embodiment of the disclosure.
Figure 10:
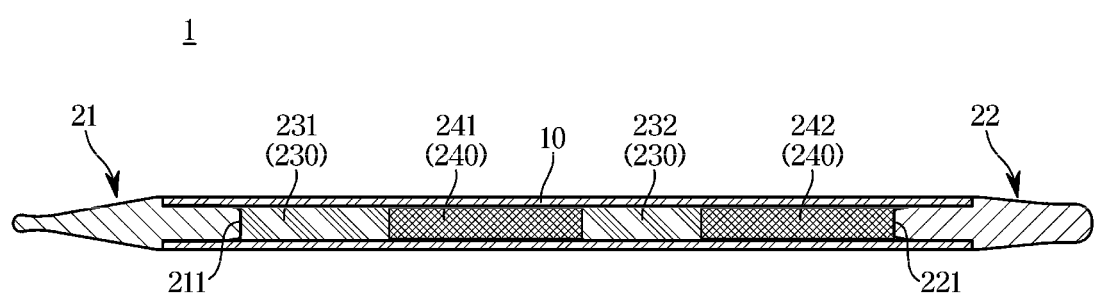
FIG. 10 is a cross-sectional view of the touch pen illustrated in FIG. 9.

FIG. 9 is an exploded perspective view of a touch pen according to another embodiment of the disclosure. FIG. 10 is a cross-sectional view of the touch pen illustrated in FIG. 9.

Because the basic configuration of the touch pen has been described above with reference to FIGS. 1 to 4, the same description will be omitted and only differences will be described.

Referring to FIGS. 9 and 10, the pen body 10 may include at least one weight member 230 and at least one buffer material 240 to prevent movement in the longitudinal direction. The at least one weight member 230 may be inserted into the accommodation space 50. The at least one buffer material 240 may be inserted into the accommodation space 50 and arranged in the longitudinal direction with respect to the at least one weight member 230 to fix the at least one weight member 230.

The first pen tip 21 coupled to one end of the pen body may include the first contact part 211 inserted into the accommodation space 50. The at least one weight member 230 may be in contact with the first contact part 211. The second pen tip 22 coupled to the other end of the pen body may include the second contact part 221 inserted into the accommodation space 50.

The at least one weight member 230 may include a first weight member 231 and a second weight member 232 arranged in the longitudinal direction. The at least one buffer material 240 may include a first buffer material 241 disposed between the first weight member 231 and the second weight member 232, and a second buffer material 242 disposed between the second weight member 232 and the second pen tip 22. The second buffer material 242 may contact the second weight member 232 and the second contact part 221, respectively.

Figure 11:
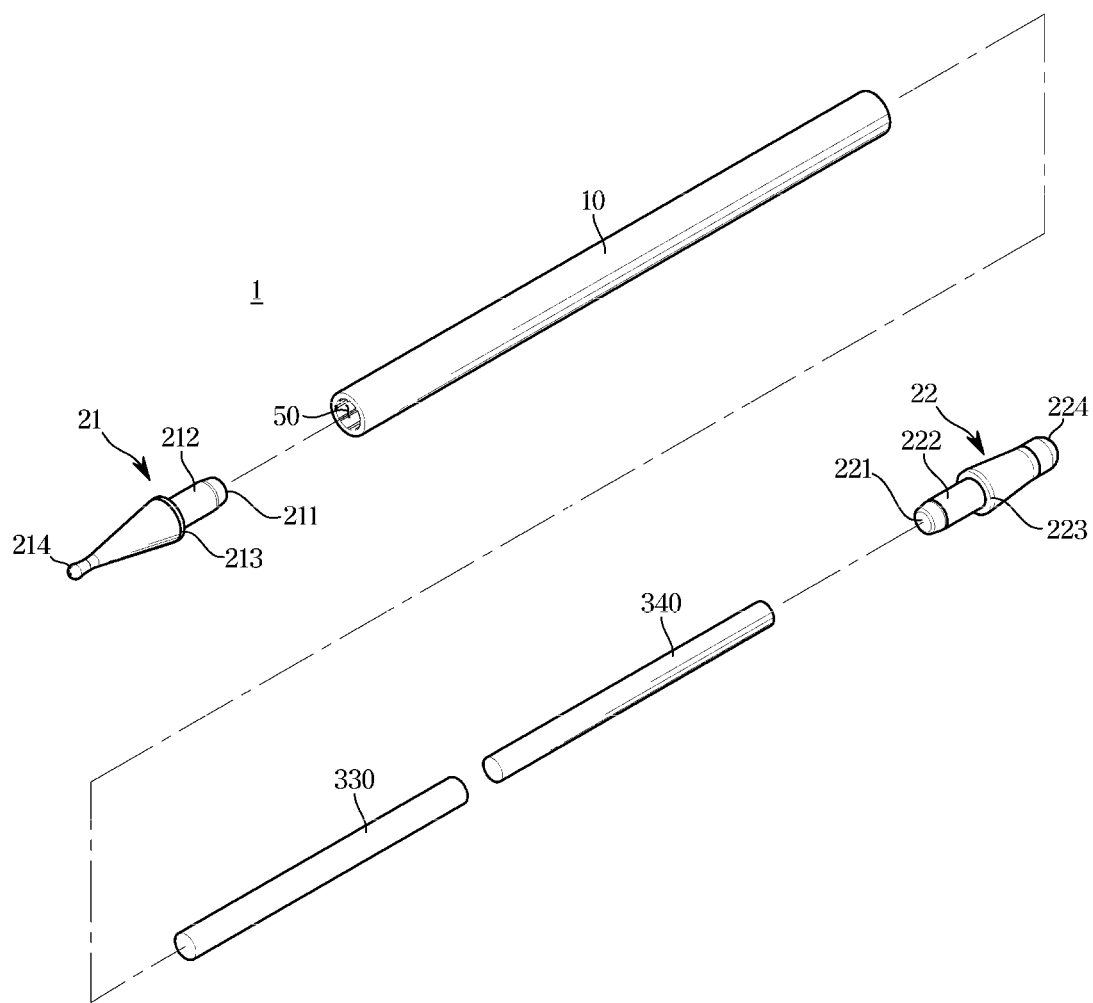
FIG. 11 is an exploded perspective view of a touch pen according to another embodiment of the disclosure.
Figure 12:
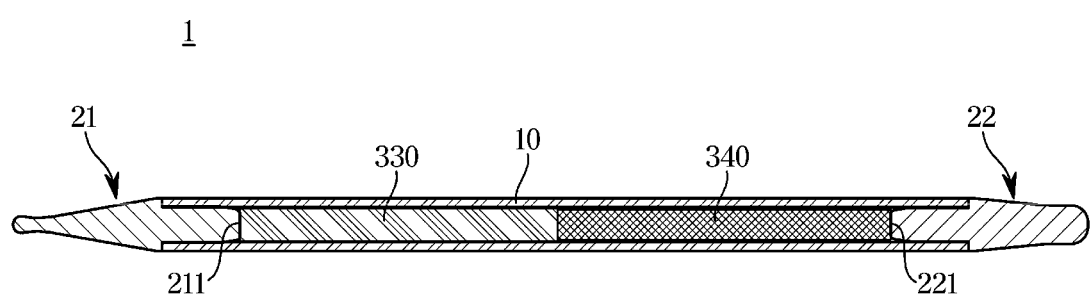
FIG. 12 is a cross-sectional view of the touch pen illustrated in FIG. 11.

FIG. 11 is an exploded perspective view of a touch pen according to another embodiment of the disclosure. FIG. 12 is a cross-sectional view of the touch pen illustrated in FIG. 11.

Referring to FIGS. 11 and 12, at least one weight member 330 may be disposed to be in contact with the first pen tip 21. At least one buffer material 340 may be disposed between the at least one weight member 330 and the second pen tip 22. The at least one buffer material 340 may be in contact with the at least one weight member 330 and the second contact part 221, respectively.

The foregoing has illustrated and described example embodiments. However, it should be understood that the disclosure is not limited to the above-described embodiments, and various changes and modifications may be made without departing from the technical idea of the disclosure described in the following claims.

What is claimed is:

1. A touch pen for an electronic device, the touch pen comprising:
    a pen body having an accommodation space extending in a longitudinal direction;
    a pen tip coupled to one end of the pen body;
    a plurality of weight members disposed inside the accommodation space; and
    a buffer material disposed between adjacent weight members among the plurality of weight members to prevent movement of the plurality of weight members in the longitudinal direction,
    wherein the plurality of weight members include a first weight member, a second weight member, and a third weight member disposed in the longitudinal direction, and the buffer material includes a first buffer material disposed between the first weight member and the second weight member, and a second buffer material disposed between the second weight member and the third weight member, and
    wherein the pen tip includes a first contact part disposed inside the accommodation space, and the first weight member is in contact with the first contact part.

2. The touch pen according to claim 1, wherein
    the pen tip is a first pen tip,
    the touch pen further comprises a second pen tip disposed at another end of the pen body which includes a second contact part disposed inside the accommodation space, and
    the third weight member is in contact with the second contact part.

3. The touch pen according to claim 1, wherein
    a cross-section of the pen body has a serration shape such that a separate adhesive is not required to prevent noise from being generated by one or more of the plurality of weight members when the touch pen is shaken.

4. The touch pen according to claim 1, wherein
    one or more of the plurality of weight members includes a magnet.

5. The touch pen according to claim 1, wherein
    the buffer material includes a rubber material.

6. The touch pen according to claim 1, wherein
    the pen tip includes a wood material.

7. A touch pen for an electronic device, the touch pen comprising:

a pen body having an accommodation space extending in a longitudinal direction;

a pen tip coupled to one end of the pen body;

a plurality of weight members disposed inside the accommodation space; and a buffer material disposed between adjacent weight members among the plurality of weight members to prevent movement of the plurality of weight members in the longitudinal direction, wherein the pen tip is a first pen tip, the touch pen further comprises a second pen tip coupled to another end of the pen body, the plurality of weight members include a first weight member and a second weight member, the buffer material is disposed inside the accommodation space and disposed in the longitudinal direction with respect to the first weight member to fix the first weight member, the first pen tip includes a first contact part disposed inside the accommodation space, the second pen tip includes a second contact part disposed inside the accommodation space, the first weight member is in contact with the first contact part, and the touch pen further comprises another buffer material disposed inside the accommodation space and in contact with the second contact part.

8. The touch pen according to claim 7, wherein the first weight member and the second weight member are disposed in the longitudinal direction, the buffer material is disposed between the first weight member and the second weight member, and the second buffer material is disposed in contact with the second weight member and the second contact part.

9. The touch pen according to claim 7, wherein the buffer material is disposed between the first weight member and the second pen tip, and the another buffer material is disposed between the second weight member and the second pen tip.

10. A touch pen for an electronic device, the touch pen comprising:

a pen body having an accommodation space extending in a longitudinal direction;

a pen tip coupled to one end of the pen body;

a plurality of weight members disposed inside the accommodation space; and a buffer material disposed between adjacent weight members among the plurality of weight members to prevent movement of the plurality of weight members in the longitudinal direction, wherein the pen tip is a first pen tip, the touch pen further comprises a second pen tip disposed at another end of the pen body which includes a second contact part disposed inside the accommodation space, the plurality of weight members include a first weight member disposed in contact with the first pen tip and a second weight member disposed in contact with the second pen tip, and the buffer material is disposed between the first weight member and the second weight member.

* * * * *